(12) United States Patent
Yu

(10) Patent No.: US 8,544,616 B2
(45) Date of Patent: Oct. 1, 2013

(54) BRAKE DISC FOR BICYCLES

(76) Inventor: Yao-Hui Yu, New Taipei (TW)

( * ) Notice: Subject to any disclaimer, the term of this patent is extended or adjusted under 35 U.S.C. 154(b) by 39 days.

(21) Appl. No.: 13/405,795

(22) Filed: Feb. 27, 2012

(65) Prior Publication Data
US 2013/0186719 A1 Jul. 25, 2013

(30) Foreign Application Priority Data
Jan. 20, 2012 (TW) ............................. 101201601 A

(51) Int. Cl.
*F16D 65/12* (2006.01)
(52) U.S. Cl.
USPC ................................... 188/218 XL; 188/18 A
(58) Field of Classification Search
USPC ........................... 188/17, 18 R, 18 A, 218 XL
See application file for complete search history.

(56) References Cited

U.S. PATENT DOCUMENTS
2008/0060891 A1* 3/2008 Chen et al. .............. 188/218 XL
2012/0048661 A1* 3/2012 Moore .................... 188/218 XL

* cited by examiner

*Primary Examiner* — Christopher Schwartz
(74) *Attorney, Agent, or Firm* — Ditthavong Mori & Steiner, P.C.

(57) ABSTRACT

A brake disk for bicycles has an inner disk, two outer disks and multiple brake units. The brake units, rather than the outer disks, are used to rub with the disk brake pads. As each brake unit is a small lump, the brake units can be easily made of material with high abrasion resistance, high temperature resistance, and low heat conduction, and the brake units still can sustain sufficient strength. With those features of material, the brake disk for bicycles does not deform easily by the heat, and the glue between the outer disks and the inner disk does not melt easily by the heat from the outer disks. Because each brake unit, which is used to rub, is independent from the outer disks, the outer disks can be made of light material, and the whole weight reduces as well.

17 Claims, 6 Drawing Sheets

BRAKE DISC FOR BICYCLES

BACKGROUND OF THE INVENTION

1. Field of the Invention

The present invention relates to a brake disk for bicycles, especially to a brake disk for bicycles with high abrasion resistance, high temperature resistance and low heat conduction.

2. Description of the Prior Arts

A bicycle is a very common vehicle. Some bicycles have a disk brake system, and the disk brake system has a brake disk and two disk brake pads. The brake disk is mounted on the hubs of the bicycle, and the disk brake pads are respectively mounted on the both sides of the brake disk. When the user operates the disk brake system, the disk brake pads move inside and clamp the brake disk. With the friction between the disk brake pads and the brake disk, the wheel stops rotating gradually.

Bicycles tend to get light-weighted currently, and the components of the bicycles are made of light materials, such as carbon fiber or light alloy like aluminum alloy. The brake disk is made of those materials as well. However, the friction between the disk brake pads and the brake disk causes high temperature, and the carbon fiber has low abrasion resistance and low temperature resistance, so the carbon fiber is not suitable to rub against the disk brake pad. As a result, the brake disk is divided into two outer disks and an inner disk. The outer disks are used to rub against the disk brake pads, so the outer disks are made of metal. The inner disk is clamped between and glued to the outer disks, so the inner disk is made of carbon fiber to reduce the whole weight.

However, this brake disk has the following shortcomings

Although the outer disks are made of metal, the deformation resistance of the outer disks is not good enough. The thickness of the outer disks is too thin, so the outer disks still may deform.

Additionally, metal can conduct heat easily, so the heat generated by friction would be quickly transmitted to the inner disk, and makes the glue between the inner disk and the outer disks melt and lose its function. Then, the inner disk and the outer disks depart from each other and the whole brake disk is broken.

Manufacturers have invented a brake disk made of material with high abrasion resistance, high temperature resistance, and low heat conduction, such as silicon carbide ceramic. However, said certain material is hard to obtain, and the brake disk made is too thin and therefore too fragile.

To overcome the shortcomings, the present invention provides a brake disk for bicycles to mitigate or obviate the aforementioned problems.

SUMMARY OF THE INVENTION

The main objective of the present invention is to provide a brake disk for bicycles with high abrasion resistance, high temperature resistance, and low heat conduction, so the present invention is durable.

The brake disk for bicycles in accordance with the present invention has an inner disk, two outer disks and multiple brake units. The brake units, rather than the outer disks, are used to rub with the disk brake pads. As each brake unit is a small lump, the brake units can be easily made of material with high abrasion resistance, high temperature resistance, and low heat conduction, and the brake units still can sustain sufficient strength. With those features of material, the brake disk for bicycles does not deform easily by the heat, and the glue between the outer disks and the inner disk does not melt easily by the heat from the outer disks. Because each brake unit, which is used to rub, is independent from the outer disks, the outer disks can be made of light material, and the whole weight reduces as well.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
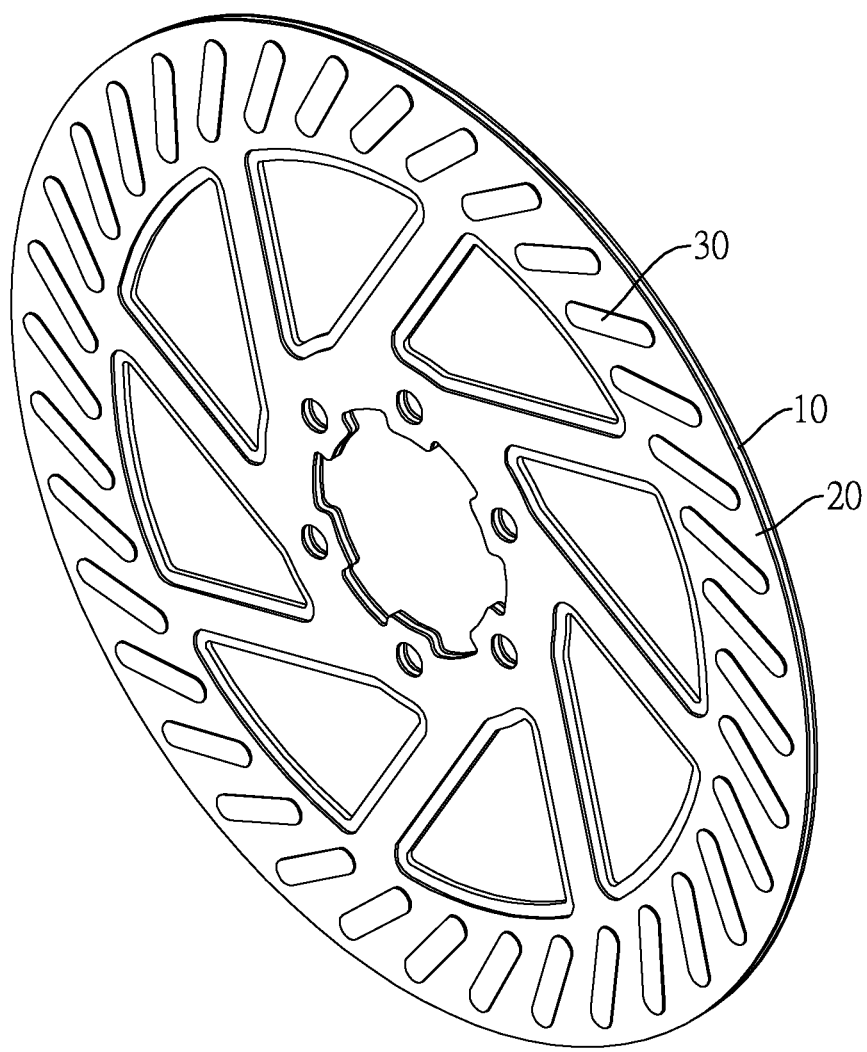
FIG. 1 is a perspective view of a first embodiment of a brake disk for bicycles in accordance with the present invention.
Figure 2:
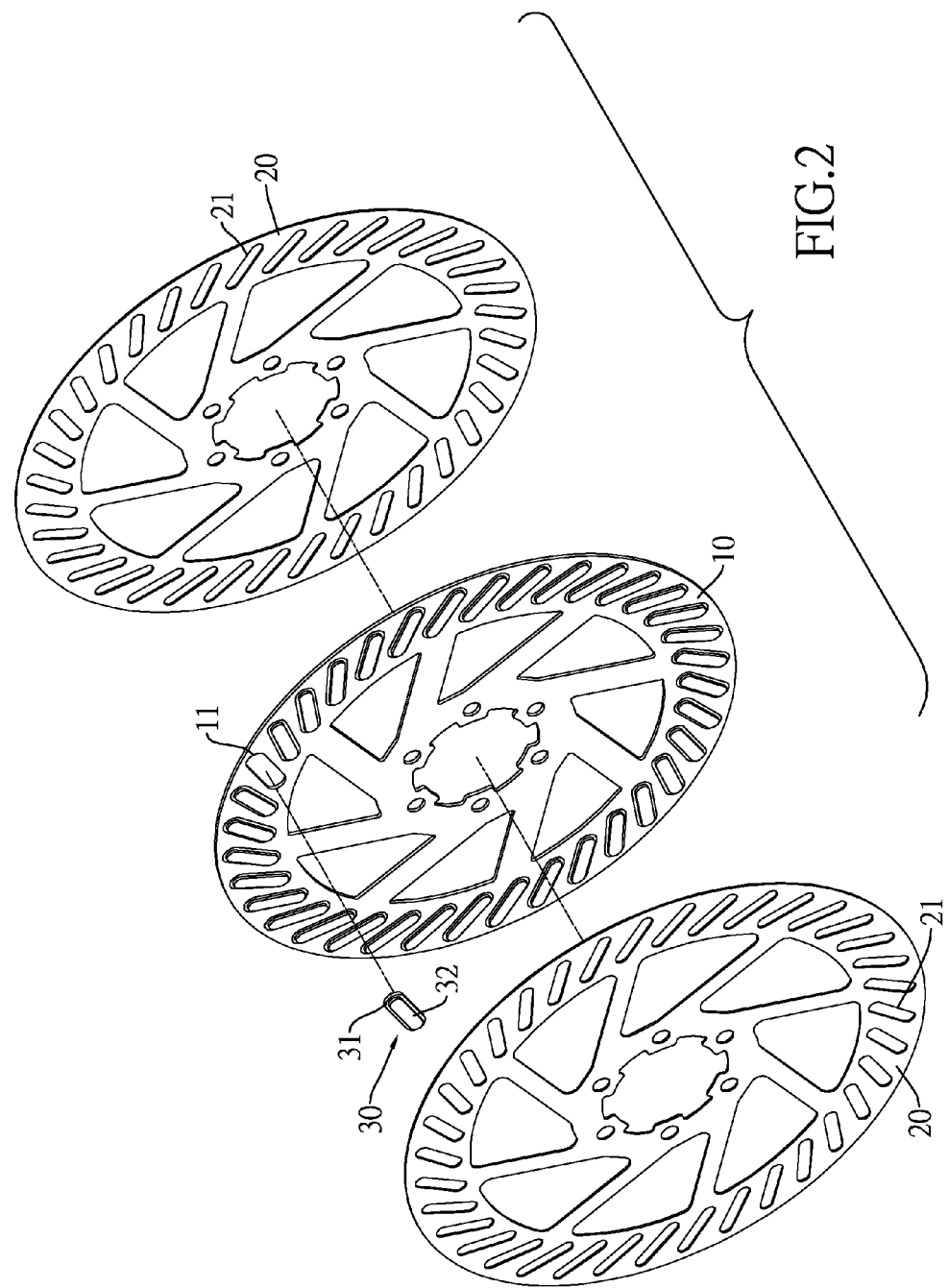
FIG. 2 is an exploded perspective view of the brake disk for bicycles in FIG. 1.

With reference to FIGS. 1 and 2, a brake disk for bicycles in accordance with the present invention comprises an inner disk 10, two outer disks 20 and multiple brake units 30.

Figure 3:
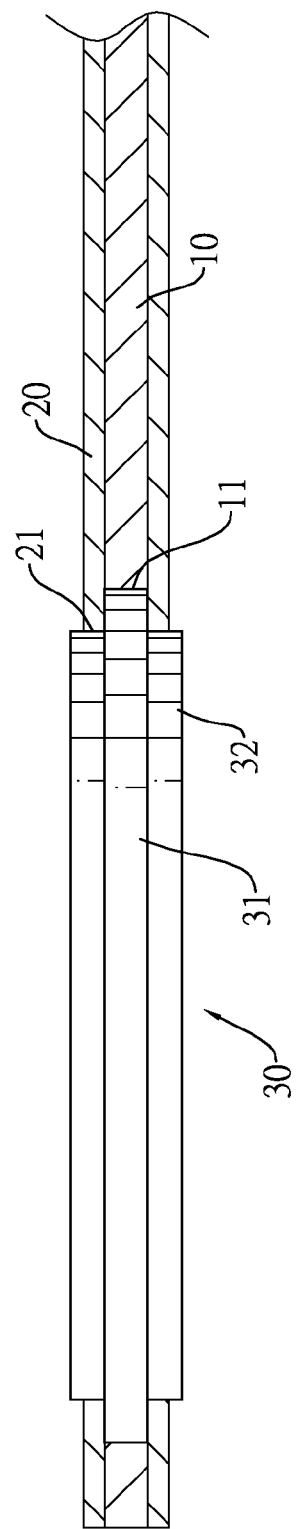
FIG. 3 is a side view in partial section of the brake disk for bicycles in FIG. 1.
Figure 4:
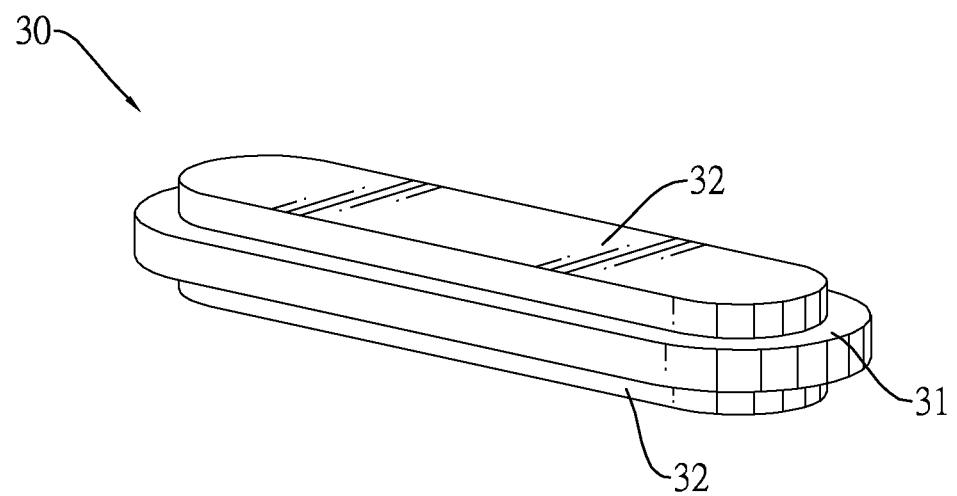
FIG. 4 is a perspective view of the brake unit of the brake disk for bicycles in FIG. 1.

With reference to FIGS. 2 to 4, the inner disk 10 has multiple inner fastening holes 11. The inner fastening holes 11 are formed through and are annularly arranged separately on the inner disk 10.

The outer disks 20 are respectively mounted on two sides of the inner disk 10 and clamp the inner disk 10, and each outer disk 20 has multiple outer fastening holes 21. The outer fastening holes 21 are formed through and are annularly arranged separately on the outer disk 20.

In a preferred embodiment, the inner disk 10 is made of carbon fiber, glass fiber, or engineering plastic, and the outer disks 20 are made of carbon fiber, glass fiber, or engineering plastic. The outer disks 20 and the inner disk 10 are glued to each other.

The brake units 30 are mounted in the inner disk 10 and the outer disks 20, and are clamped between the outer disks 20. Each brake unit 30 has a flange segment 31 and two protrusions 32. The flange segment 31 is mounted in one of the inner fastening holes 11 of the inner disk 10, and two opposite surfaces of the flange segment 31 respectively abut the outer disks 20. The protrusions 32 are respectively formed on the two opposite surfaces of the flange segment 31, are respectively mounted in one of the outer fastening holes 21 of the outer disks 20, and protrude out of the outer disks 20. The area of the flange segment 31 is larger than an area of each protrusion 32. The brake units 30 are made of materials with high abrasion resistance, high temperature resistance, and low heat conduction.

In a preferred embodiment, the brake units 30 are made of ceramic. The flange segment 31 is elongated, and two opposite sides of the flange segment 31 are curved. Each protrusion 32 is elongated, and two opposite sides of the protrusion 32 are curved.

When the brake disk for bicycles as described is used, the brake units 30, which slightly protrude out of the outer disks 20, are used to rub against the disk brake pads. As each brake unit 30 is a small lump, the brake units 30 can be easily made of material with high abrasion resistance, high temperature resistance, and low heat conduction. The brake units 30 still can sustain sufficient strength, so the whole brake disk is not fragile. With those features of material, the brake disk for bicycles does not deform easily by the heat, and the glue between the outer disks 20 and the inner disk 10 does not melt easily by the heat from the outer disks 20. With each brake unit 30 independent from the outer disks 20, the outer disks 20 can be made of light material, and the whole weight reduces as well.

Figure 5:
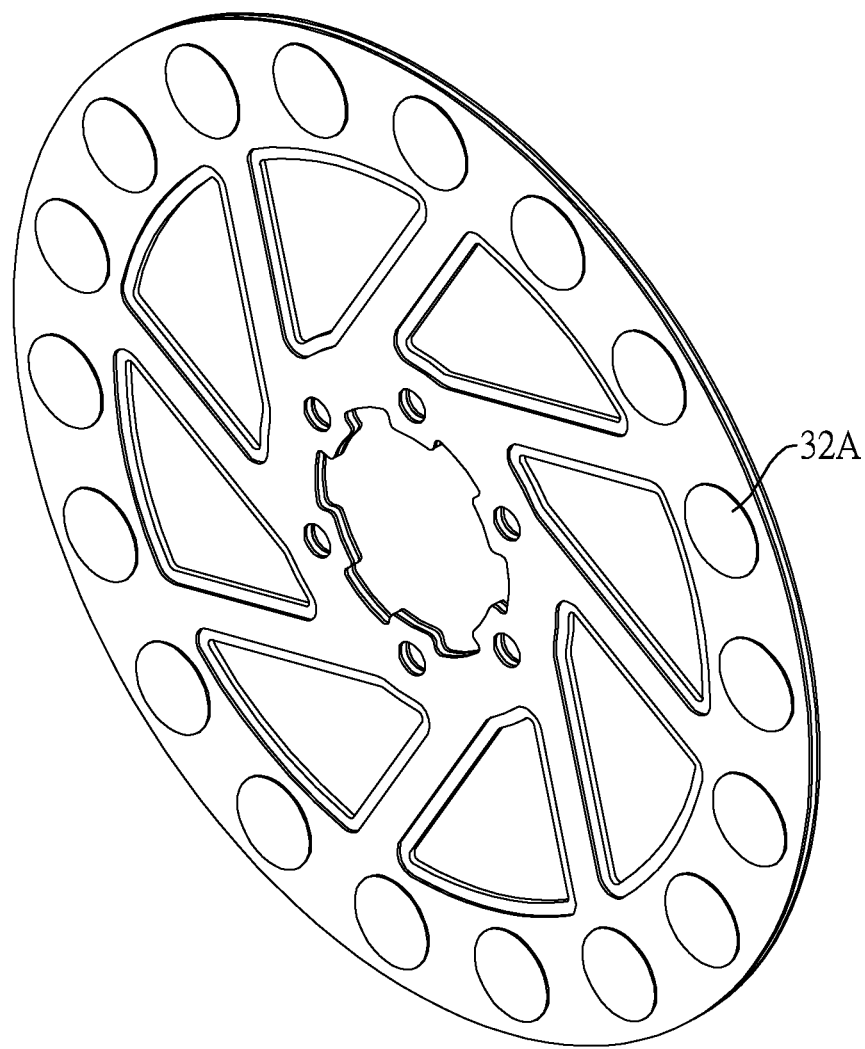
FIG. 5 is a perspective view of a second embodiment of the brake disk for bicycles in accordance with the present invention.
Figure 6:
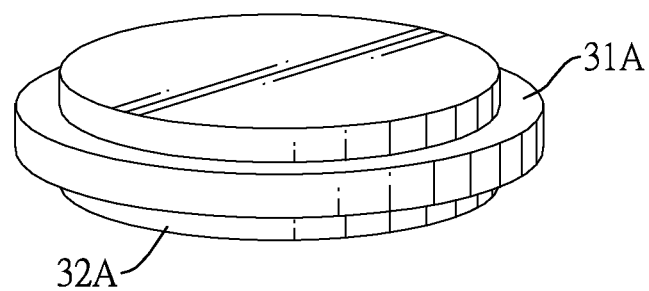
FIG. 6 is a perspective view of the brake unit of the brake disk for bicycles in FIG. 5.

In another preferred embodiment as shown in FIGS. 5 and 6, the flange segment 31A is circular, and each protrusion 32A is also circular.

In another preferred embodiment, the flange segment and the protrusions are shaped into illustrations or characters.

In another preferred embodiment, the brake units are made of aluminum oxide, zirconium oxide, or silicon carbide.

In another preferred embodiment, the outer disks are made of metal, and the inner disk is also made of metal. The outer disks and the inner disk are welded to each other.

In another preferred embodiment, the materials of the outer disks and the inner disk may be different.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A brake disk for bicycles comprising:
    an inner disk having
        multiple inner fastening holes formed through and annularly arranged separately on the inner disk;
    two outer disks respectively mounted on two sides of the inner disk, clamping the inner disk, and each outer disk having
        multiple outer fastening holes formed through and annularly arranged separately on the outer disk; and
    multiple brake units mounted in the inner disk and the outer disks, clamped between the outer disks, and each brake unit having
        a flange segment mounted in one of the inner fastening holes of the inner disk, and two opposite surfaces of the flange segment respectively abutting the outer disks; and
        two protrusions respectively formed on the two opposite surfaces of the flange segment, respectively mounted in one of the outer fastening holes of the outer disks, and protruding out of the outer disks;
    wherein an area of the flange segment is larger than an area of each protrusion; and the brake units are made of materials with high abrasion resistance, high temperature resistance, and low heat conduction.

2. The brake disk for bicycles as claimed in claim 1, wherein
    the flange segment is elongated, and two opposite sides of the flange segment are curved; and
    each protrusion is elongated, and two opposite sides of the protrusion are curved.

3. The brake disk for bicycles as claimed in claim 2, wherein the brake units are made of ceramic.

4. The brake disk for bicycles as claimed in claim 3, wherein the outer disks are made of carbon fiber, glass fiber, or engineering plastic, and the inner disk is made of carbon fiber, glass fiber, or engineering plastic.

5. The brake disk for bicycles as claimed in claim 4, wherein the outer disks and the inner disk are glued to each other.

6. The brake disk for bicycles as claimed in claim 3, wherein the outer disks are made of metal, and the inner disk is also made of metal.

7. The brake disk for bicycles as claimed in claim 6, wherein the outer disks and the inner disk are welded to each other.

8. The brake disk for bicycles as claimed in claim 2, wherein the brake units are made of aluminum oxide, zirconium oxide, or silicon carbide.

9. The brake disk for bicycles as claimed in claim 1, wherein the flange segment is circular; and each protrusion is circular.

10. The brake disk for bicycles as claimed in claim 9, wherein the brake units are made of ceramic.

11. The brake disk for bicycles as claimed in claim 9, wherein the brake units are made of aluminum oxide, zirconium oxide or silicon carbide.

12. The brake disk for bicycles as claimed in claim 1, wherein the outer disks are made of carbon fiber, glass fiber, or engineering plastic, and the inner disk is made of carbon fiber, glass fiber, or engineering plastic.

13. The brake disk for bicycles as claimed in claim 12, wherein the outer disks and the inner disk are glued to each other.

14. The brake disk for bicycles as claimed in claim 1, wherein the outer disks are made of metal, and the inner disk is also made of metal.

15. The brake disk for bicycles as claimed in claim 14, wherein the outer disks and the inner disk are welded to each other.

16. The brake disk for bicycles as claimed in claim 1, wherein the brake units are made of ceramic.

17. The brake disk for bicycles as claimed in claim 1, wherein the brake units are made of aluminum oxide, zirconium oxide, or silicon carbide.

* * * * *